(12) United States Patent
Al Rawi et al.

(10) Patent No.: US 10,574,292 B2
(45) Date of Patent: Feb. 25, 2020

(54) METHOD AND APPARATUS FOR TRANSMITTING DATA OVER METALLIC WIRE PAIRS

(71) Applicant: British Telecommunications Public Limited Company, London (GB)

(72) Inventors: Anas Al Rawi, London (GB); Christopher Botham, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/329,523

(22) PCT Filed: Aug. 29, 2017

(86) PCT No.: PCT/EP2017/071667
§ 371 (c)(1),
(2) Date: Feb. 28, 2019

(87) PCT Pub. No.: WO2018/041833
PCT Pub. Date: Mar. 8, 2018

(65) Prior Publication Data
US 2019/0222257 A1    Jul. 18, 2019

(30) Foreign Application Priority Data

Aug. 29, 2016  (EP) ..................... 16186093

(51) Int. Cl.
*H04B 3/32*   (2006.01)
*H04B 3/487*  (2015.01)
(Continued)

(52) U.S. Cl.
CPC ............... *H04B 3/32* (2013.01); *H04B 3/487* (2015.01); *H04B 7/02* (2013.01); *H04L 5/14* (2013.01);
(Continued)

(58) Field of Classification Search
CPC . H04B 3/32; H04B 7/02; H04B 3/487; H04B 3/50; H04L 5/14; H04L 5/20; H04L 25/085
See application file for complete search history.

(56) References Cited

U.S. PATENT DOCUMENTS 7,359,428 B2    4/2008   Rovini et al.
8,416,864 B2    4/2013   Korobkov et al.
(Continued)

FOREIGN PATENT DOCUMENTS

EP    2 091 196    8/2009
EP    2 383 897    11/2011
(Continued)

OTHER PUBLICATIONS

International Search Report and Written Opinion for corresponding PCT Application No. PCT/EP2017/071667, dated Oct. 9, 2017, 11 pages.
(Continued)

*Primary Examiner* — Dac V Ha
(74) *Attorney, Agent, or Firm* — Patterson Thuente Pedersen, P.A.

(57) ABSTRACT

A method of transmitting, using a discrete multi-tone technique, data between a first and a second transceiver over a plurality of metallic pairs connected between the first and second transceivers, providing a plurality of transmission channels, is disclosed.

12 Claims, 4 Drawing Sheets

(51) Int. Cl.
*H04B 7/02* (2018.01)
*H04L 25/08* (2006.01)
*H04L 5/14* (2006.01)
*H04L 5/20* (2006.01)
*H04B 3/50* (2006.01)

(52) U.S. Cl.
CPC .............. *H04L 5/20* (2013.01); *H04L 25/085* (2013.01); *H04B 3/50* (2013.01)

(56) References Cited

U.S. PATENT DOCUMENTS

| | | | |
|---|---|---|---|
| 8,675,469 | B2 | 3/2014 | Anschutz et al. |
| 8,780,686 | B2 | 7/2014 | Sands et al. |
| 8,848,555 | B2 | 9/2014 | Lindqvist et al. |
| 9,020,145 | B2 | 4/2015 | Liang et al. |
| 9,083,785 | B2 | 7/2015 | Goodson et al. |
| 9,088,350 | B2 | 7/2015 | Pereira |
| 9,225,826 | B2 | 12/2015 | Shi et al. |
| 9,287,928 | B2 | 3/2016 | Clausen |
| 9,362,959 | B2 | 6/2016 | Kuipers et al. |
| 9,548,792 | B2 | 1/2017 | Schenk et al. |
| 1,009,102 | A1 | 10/2018 | Horsley et al. |
| 1,019,359 | A1 | 1/2019 | Al Rawi et al. |
| 1,030,571 | A1 | 5/2019 | Humphrey et al. |
| 2004/0186865 | A1 | 9/2004 | Schenk |
| 2009/0302965 | A1* | 12/2009 | Lee .................. H03K 5/131 333/2 |
| 2010/0135374 | A1* | 6/2010 | Kozek .................. H04M 3/304 375/227 |
| 2011/0235759 | A1* | 9/2011 | Pierrugues .............. H04B 3/32 375/346 |
| 2016/0164621 | A1* | 6/2016 | Tsiaflakis .................. H04J 3/10 379/406.04 |
| 2017/0026521 | A1 | 1/2017 | Horsley et al. |
| 2017/0085719 | A1 | 3/2017 | Linney et al. |

FOREIGN PATENT DOCUMENTS

| | | |
|---|---|---|
| WO | WO 2002025920 | 3/2002 |
| WO | WO 2008005507 | 1/2008 |
| WO | WO 2011061722 | 5/2011 |
| WO | WO 2013026479 | 2/2013 |
| WO | WO 2016050765 | 4/2016 |
| WO | WO 2016139156 | 9/2016 |
| WO | WO 2016139254 | 9/2016 |
| WO | WO 2018060259 | 4/2018 |

OTHER PUBLICATIONS

Fazlollahi et al., "Copper Makes 5G Wireless Access to Indoor Possible", 2015 IEEE Global Communications Conference (GlobeCom), IEEE, Dec. 6, 2015, XP032872400, DOI: 10.1109/GLOCOM.2014.7417247, 5 pages.

Riihonen, et al., "Large-System Analysis of Rate Regions in Bidirectional Full-Duplex MIMO Link: Suppression versus Cancellation", 2013 47*th* Annual Conference on Information Sciences and Systems (CISS), IEEE, Mar. 20, 2013, pp. 1-6, XP032497581, DOI 10.1109/CISS.2013.6552337 ISBN: 978-1-4673-5237-6 [retrieved on Jul. 2, 2013].

Application and Filing Receipt for U.S. Appl. No. 15/515,403, filed Mar. 29, 2017, Inventors: Al Rawi et al.

Application as filed for U.S. Appl. No. 16/338,106, filed Mar. 29, 2019, Inventors: Al Rawi et al.

International Search Report for corresponding International Application No. PCT/EP2015/072407 dated Dec. 18, 2015; 4 pages.

Written Opinion of the International Searching Authority for corresponding International Application No. PCT/EP2015/072407 dated Dec. 18, 2015; 5 pages.

Karp et al., "Zero-forcing frequency-domain equalization for generalized DMT transceivers with insufficient guard interval," EURASIP Journal on Applied Signal Processing (2004) 10: 1446-1459.

Tang et al., "Multiple users adaptive modulation schemes for MC-CDMA." Global Telecommunications Conference, 2004. Globecom '04. IEEE Dallas, TX, Nov. 29-Dec. 3, 2004; 3823-3827. XP010758452.

International Search Report and Written Opinion for corresponding International Application No. PCT/EP2017/074515 dated Nov. 7, 2017; 10 pages.

Coomans et al.; "XG-FAST: The 5*TH* Generation Broadband", IEEE Communications Magazine—Communications Standards Supplement; Dec. 2015; 6 pages.

GB Search Report for GB Application No. GB1616591.2, dated Mar. 17, 2017; 6 pages.

Lafata et al.; "Increasing the transmission capacity of digital subscriber lines with phantom circuit and crosstalk cancelation", published online Nov. 15, 2014; Springer Science+Business Media, New York; 8 pages.

Foubert et al.; "Exploiting the Phantom-Mode Signal in DSL Applications", IEEE Transactions on Instrumentation and Measurement, vol. 61, No. 4, Apr. 2012; 7 pages.

* cited by examiner

METHOD AND APPARATUS FOR TRANSMITTING DATA OVER METALLIC WIRE PAIRS

CROSS-REFERENCE TO RELATED APPLICATION

The present application is a National Phase entry of PCT Application No. PCT/EP2017/071667, filed Aug. 29, 2017, which claims priority from EP Patent Application No. 16186093.7 filed Aug. 29, 2016 each of which is hereby fully incorporated herein by reference.

TECHNICAL FIELD

The present disclosure relates to the transmission (and reception) of data carried over groups or bundles of metallic wire pairs, in particular twisted metallic pairs such as the twisted copper pairs commonly used in telecommunications access networks. In particular, it relates to a technique for exploiting relatively high frequencies to carry such data in an efficient manner.

BACKGROUND

Telecommunications access networks have significantly increased the amount of optical fiber connections used within the network in recent years in order to meet the ever-increasing demand from customers, both business and private, for increased broadband data rates. Fiber to the home or premises is the ultimate goal in terms of achievable data rate, but will incur significant costs to the service providers. Instead, hybrid fiber-copper networks have been employed extensively, where the fiber network is extended to a distribution point (DP) in the vicinity of the customer premises, and the existing copper wire infrastructure is used for the last leg of the communications from the DP to the customer premises equipment (CPE).

Recent standards have seen the length of the copper wire drop decreasing as fiber connections are extended to DP's closer to the customer, allowing increases in capacity. Shorter wires offer the potential to expand the region of operation to higher frequency bands, but the channel conditions in these new regions present new challenges.

The MIMO binder channel model has been used in recent standards to model the crosstalk interference between the wire pairs in the binder from DP to CPE. This has allowed cancellation of far-end crosstalk (FEXT) through precoding techniques known as vectoring. In general, the strong near-end crosstalk (NEXT) is avoided through use of time or frequency duplexing. Channel measurements at the higher frequencies now under consideration for next generation digital subscriber line (DSL) systems, show that the FEXT paths provide as much or more power to the receiver than the direct path at these higher frequencies.

These paths make conventional vectoring approaches less effective but offer a source of diversity which may be exploited to improve system performance.

SUMMARY

The present disclosure accordingly provides, in a first aspect, a method of transmitting, using a discrete multi-tone technique, data between a first and a second transceiver over a plurality of metallic pairs, connected between the first and second transceivers, providing a plurality of transmission channels, the method comprising: receiving at the first transceiver a data stream for transmission to the second receiver; generating from the data stream a main transmission signal for transmission over one of the transmission channels operating as a main transmission channel, generating from the data stream an auxiliary transmission signal for transmission over another one of the transmission channels operating as an auxiliary transmission channel, receiving at the second transceiver from the main transmission channel a main received signal and receiving at the second transceiver from the auxiliary transmission channel an auxiliary received signal; and processing the received main and auxiliary signals in order to recover the data stream received at the first transceiver; wherein the auxiliary transmission signal is generated in dependence upon a measurement of the cross-talk coupling from the point of transmission from the first transceiver onto the auxiliary transmission channel to the point of reception at the second transceiver from the main transmission channel and wherein the processing of the received main and auxiliary signals is done in dependence upon measurements of the cross-talk coupling from the point of transmission from the first transceiver onto the main transmission channel to the point of reception at the first transceiver from the auxiliary transmission channel and/or vice versa, and of the cross-talk coupling from the point of transmission from the second transceiver onto the main transmission channel to the point of reception at the second transceiver from the auxiliary transmission channel.

In this way it is possible to use, for example, Null Space Projection techniques to permit full duplex transmission simultaneously between the first and second transceivers in both directions across a predetermined frequency range as well as employing techniques, such as Maximum Ratio Combining, in order to enhance the signal strength of the received signals.

The detailed mathematical explanation of an embodiment of this approach is set out in the technical paper appended to the present specification in the appendix located at the end of the specific description of the present application which forms an important part of the teaching of the present application. The contents of the appendix are hereby incorporated by reference into the present application.

In some embodiments, generating the auxiliary transmission signal includes processing the auxiliary transmission signal prior to transmission from the first transceiver. This processing may involve maximum ratio combining. The processing may cause the phase of the auxiliary transmission signal to be more closely aligned with the phase of the main transmission signal at the point of reception at the second transceiver. This may result in constructive interference between the main and auxiliary transmission signals. This processing may involve multiplying the auxiliary transmission signal by a digital spatial filter.

The main and auxiliary signals received at the second transceiver may comprise a component that is an echo of a signal transmitted onto the main transmission channel by the second transceiver. It is desired to reduce the size of the echo component. To this end, the method may further comprise applying a pre-coding to the main transmission signal transmitted by the second transceiver, the pre-coding being dependent on measurements of cross talk coupling from the point of transmission of the second transceiver onto the main transmission channel to the point of reception at the second transceiver from the auxiliary transmission channel.

Furthermore, processing the received main and/or auxiliary signals may further comprise processing the received main and/or auxiliary signals such that the component that is an echo of a signal transmitter onto the main transmission channel by the second transceiver is reduced in size and is preferably reduced in size to zero. This will be referred to as NEXT processing as its purpose is to reduce NEXT (Near End Cross Talk). The NEXT processing may be dependent on measurements of cross talk coupling from the point of transmission of the second transceiver onto the main transmission channel to the point of reception at the second transceiver from the auxiliary transmission channel. The NEXT processing and the pre-coding may be coordinated such that, when the NEXT processing is applied to the received signal, it interacts with the echo component so as to reduce the size of the echo component, preferably to zero. Once the NEXT processing has been performed further processing may be performed on the remaining main and/or auxiliary signal so as to reverse the effect of the NEXT processing.

The minimum number of channels required to implement embodiments of the disclosure is 2, however it can advantageously be used with many more channels—for example as provided by a bundle of 10 or 50 twisted metallic pairs as are commonly found in telecommunication access networks (particularly in backhaul connections possibly operating in parallel with newer fiber optic connections as a backup in the event of a failure of the fiber optic connection, etc.).

In one implementation a phantom channel connection may be used as an auxiliary channel.

Indeed in a second aspect of the present disclosure, there is provided a method of transmitting, using a discrete multi-tone technique, data between a first and a second transceiver over a plurality of metallic pairs, connected between the first and second transceivers, providing a plurality of transmission channels, the method comprising: receiving at the first transceiver a data stream for transmission to the second receiver; generating from the data stream a transmission signal for transmission over one of the transmission channels operating as a main transmission channel, receiving at the second transceiver from the transmission channel a main received signal and receiving at the second transceiver from a phantom channel, also connecting the first and second transceivers, an auxiliary received signal; and processing the received main and auxiliary signals in order to recover the data stream received at the first transceiver; wherein the processing of the received main and auxiliary signals is done in dependence upon measurements of the cross-talk coupling from the point of transmission from the first transceiver onto the main transmission channel to the point of reception at the first transceiver from the phantom channel and/or vice versa, and of the cross-talk coupling from the point of transmission from the second transceiver onto the main transmission channel to the point of reception at the second transceiver from the phantom channel.

In this way it is possible to use, for example, Null Space Projection techniques to permit full duplex transmission simultaneously between the first and second transceivers in both directions across a predetermined frequency range without sacrificing a direct differential mode channel (which can still therefore be utilized for transmitting data albeit in a mode which uses time division or frequency division duplex).

In some embodiments both transceivers transmit and receive in the same manner and using the same frequencies at the same time (over at least a limited high frequency range of frequencies) so as to provide a full duplex operation without the need for using time, frequency or spatial division duplexing techniques (over the limited frequency range). In some embodiments the method of the disclosure is employed only at frequencies above a cut-off frequency which is determined in dependence upon the ratio between direct coupling and cross-talk coupling over the channels with conventional DMT techniques employing frequency and or time division duplexing being employed at frequencies below the cut-off frequency.

According to a third aspect of the present disclosure, there is provided an apparatus for transmitting, using a discrete multi-tone technique, data between a first and a second transceiver over a plurality of metallic pairs, connected between the first and second transceivers, providing a plurality of transmission channels, the apparatus comprising: the first transceiver which is operable to receive a data stream for transmission to the second receiver, to generate from the data stream a main transmission signal and to transmit this over one of the transmission channels operating as a main transmission channel and further being operable to generate, from the data stream, an auxiliary transmission signal and to transmit this over another one of the transmission channels operating as an auxiliary transmission channel; the apparatus further comprising a second transceiver which is operable to receive, from the main transmission channel, a main received signal and, from the auxiliary transmission channel, an auxiliary received signal; wherein the second transceiver is operable to process the received main and auxiliary signals in order to recover the data stream received at the first transceiver; and wherein the first transceiver is operable to generate the auxiliary transmission signal in dependence upon a measurement of the cross-talk coupling from the point of transmission from the first transceiver onto the auxiliary transmission channel to the point of reception at the second transceiver from the main transmission channel and wherein the second transceiver is operable to process the received main and auxiliary signals in dependence upon measurements of the cross-talk coupling from the point of transmission from the first transceiver onto the main transmission channel to the point of reception at the first transceiver from the auxiliary transmission channel and/or vice versa, and of the cross-talk coupling from the point of transmission from the second transceiver onto the main transmission channel to the point of reception at the second transceiver from the auxiliary transmission channel in order to recover the transmitted data.

In some embodiments, the first transceiver is operable to process the auxiliary transmission signal prior to transmission, which may involve maximum ratio combining. The processing may cause the phase of the auxiliary transmission signal to be more closely aligned with the phase of the main transmission signal at the point of reception at the second transceiver. This may result in constructive interference between the main and auxiliary transmission signals. The first transceiver may be operable to multiply the auxiliary transmission signal by a digital spatial filter.

The second transceiver may be operable to process the main transmission signal transmitted by the second transceiver, the processing being dependent on measurements of cross talk coupling from the point of transmission of the second transceiver onto the main transmission channel to the point of reception at the second transceiver from the auxiliary transmission channel.

The main and auxiliary signals received at the second transceiver may comprise a component that is an echo of a signal transmitted onto the main transmission channel by the second transceiver. It is desired to reduce the size of the echo component. To this end, the second transceiver may be operable to apply a pre-coding to the main transmission signal transmitted by the second transceiver, the pre-coding being dependent on measurements of cross talk coupling from the point of transmission of the second transceiver onto the main transmission channel to the point of reception at the second transceiver from the auxiliary transmission channel. The second transceiver may be further operable to apply NEXT processing, which is coordinated with the pre-coding such that when the NEXT processing is applied, the size of the echo component is reduced to zero. The second transceiver may be further operable to process the remaining signal to reverse the effect of the NEXT processing.

According to a fourth aspect of the present disclosure, there is provided an apparatus for transmitting, using a discrete multi-tone technique, data between a first and a second transceiver over a plurality of metallic pairs, connected between the first and second transceivers, providing a plurality of transmission channels, the apparatus comprising: the first transceiver which is operable to receive a data stream for transmission to the second receiver, to generate from the data stream a main transmission signal and to transmit this over one of the transmission channels operating as a main transmission channel; the apparatus further comprising a second transceiver which is operable to receive, from the main transmission channel, a main received signal and, from a phantom channel extending between the first and second transceivers, an auxiliary received signal and to process the received main and auxiliary signals in order to recover the data stream received at the first transceiver; wherein the second transceiver is operable to process the received main and auxiliary signals in dependence upon measurements of the cross-talk coupling from the point of transmission from the first transceiver onto the main transmission channel to the point of reception at the first transceiver from the phantom channel and/or vice versa, and in dependence upon measurements of the cross-talk coupling from the point of transmission from the second transceiver onto the main transmission channel to the point of reception at the second transceiver from the phantom channel in order to recover the transmitted data.

Further aspects relate to a computer program element comprising computer program code to, when loaded into a computer system and executed thereon, cause the computer to perform the first and or second aspects set out above.

Further aspects relate to a single transceiver capable of operating as either one of the transceivers (which can be substantially identical to one another).

BRIEF DESCRIPTION OF THE DRAWINGS

An embodiment of the present disclosure will now be described, by way of example only, with reference to the accompanying drawings, in which.

DETAILED DESCRIPTION

Figure 1:
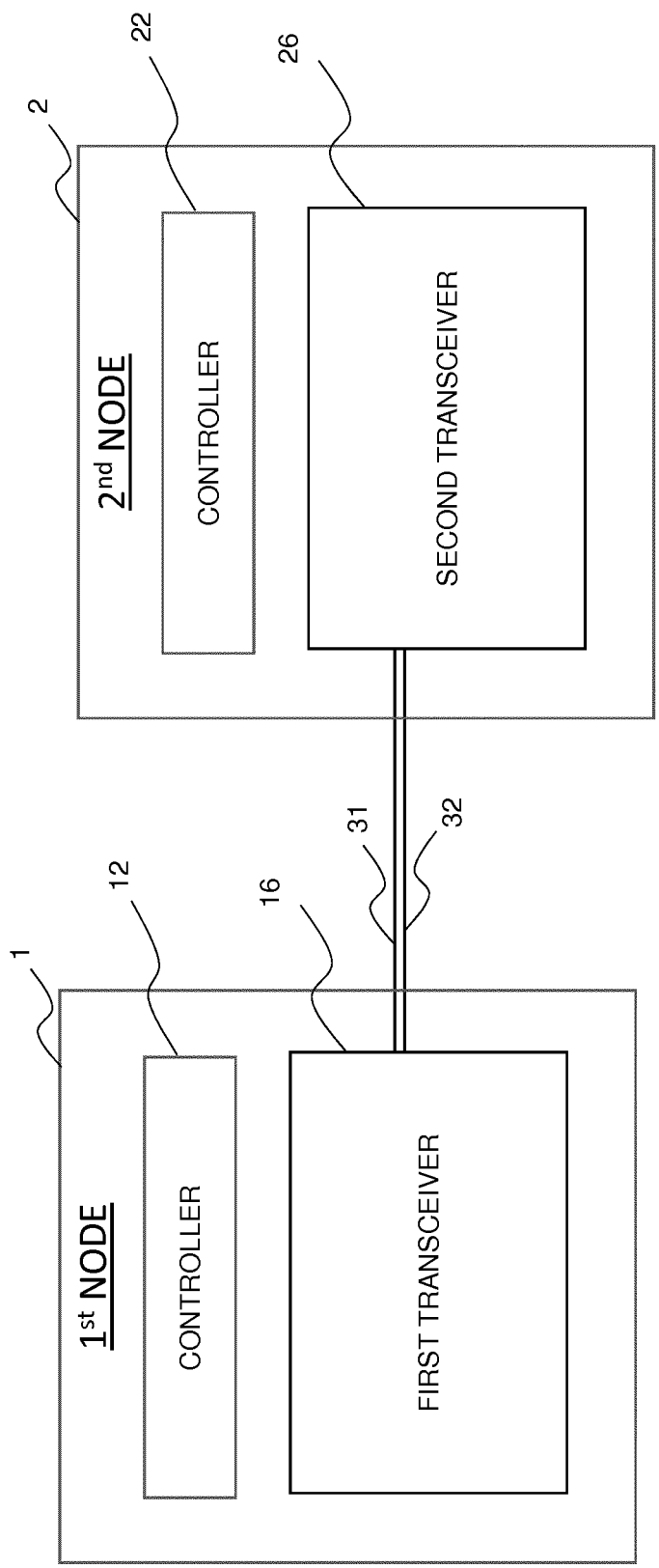
FIG. 1 is a schematic block diagram of two interconnected nodes containing transceivers operating in accordance with an embodiment of the present disclosure in order to communicate data across two pairs of wires.

FIG. 1 is a schematic diagram of an example scenario for using embodiments of the present disclosure. As shown a first node 1 is connected to a second node 2 via first and second Twisted Metallic wire Pairs (TMPs) 31, 32. Each node 1, 2 includes a controller 12, 22 which performs management and other functions for the node (e.g. communicating via an interface (not shown) to a source and/or sink of data to be communicated over the TMP's 31,32 with other, etc.). Additionally the nodes include a first and second transceiver 16, 26 respectively. The transceivers operate in a way (explained in greater detail below with reference to FIGS. 2-4 and the appended appendix) to communicate data over the TMP's between each other in a full duplex mode over a predetermined frequency range without employing frequency, spatial or time division. Instead a null space projection technique is employed to counteract the large Near End cross (X) Talk (NEXT) and additionally a beam forming technique is employed to improve the signal to noise ratio of the transmitted signal as received at the far end of the TMPs.

Figure 2:
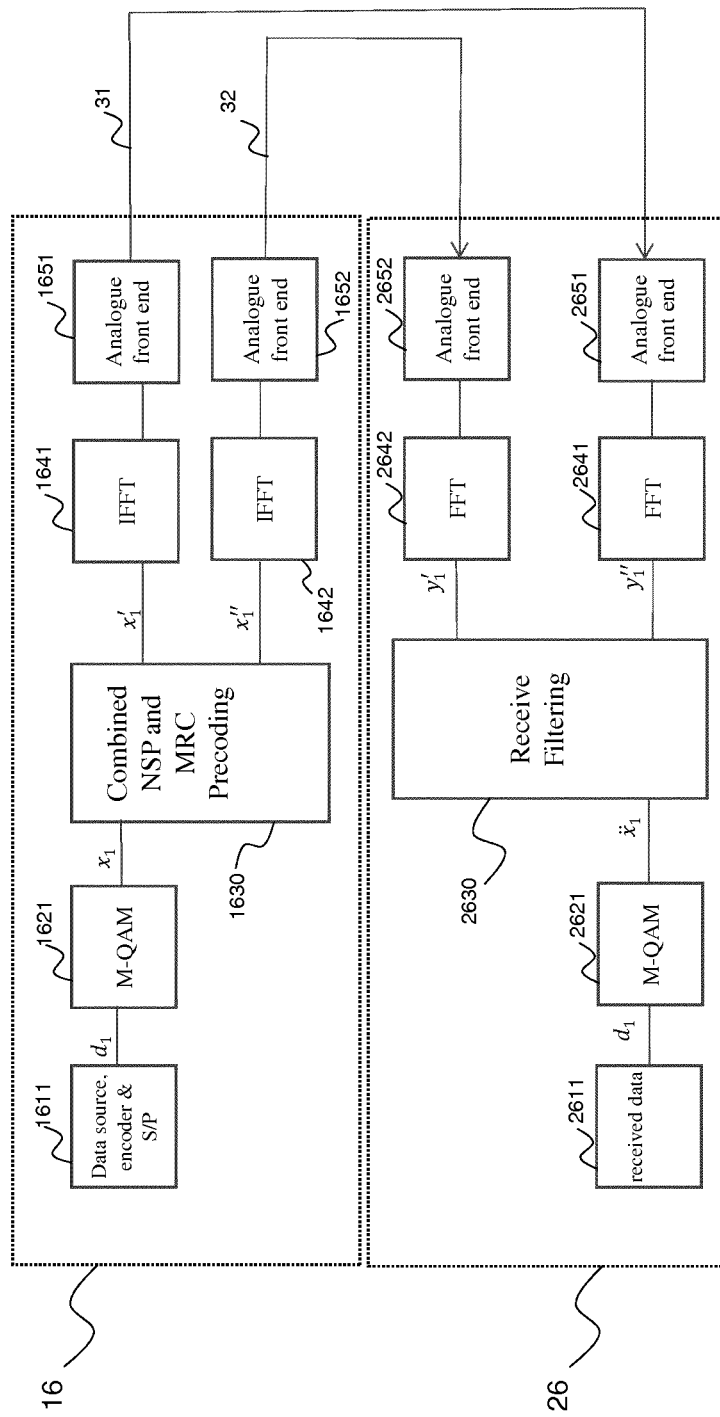
FIG. 2 is a schematic block diagram illustrating the transceivers of FIG. 1 in greater detail.

FIG. 2 illustrates the transceivers 16 and 26 in greater detail. Note that for purposes of clarity only the transmit portions of transceiver 16 are shown and only the receive portions of transceiver 26 are shown but it will be understood that both transceivers in fact include substantially identical transmit and receive portions each. Additionally, the figure omits many conventional elements of the transceiver since they are not pertinent to the present disclosure. Embodiments may include many additional components which are not shown as will be appreciated by persons skilled in the art.

As shown in FIG. 2, to permit data d1 to be transmitted from a data source 1611 within the transceiver 16 to the second transceiver 26 it is firstly passed through a modulator (M-QAM module 1621) which, for each tone, converts a piece of data d1 to a complex number $x_1$ via an appropriate mapping. The complex number $x_1$ is then passed to a combined NSP and MRC precoding module which generates a main transmission signal frequency domain component and an auxiliary transmission signal frequency domain component wherein the components are generated in a manner (described in greater detail below) such that received signals can be filtered so as to cancel out (to a significant degree) NEXT effects and to beam form such that received SNR is improved. This involves measuring the self-coupling channel coefficients $H_{aa}$, $H_{bb}$ as well as the transmission channel coefficients $H_{ab}$, $H_{ba}$ and then identifying eigen vectors of the self-coupling channel and using these to create a matrix for use in the filter which takes advantage of identifying a null-space projection in order to be able to minimize NEXT (such techniques are known in wireless applications but have not heretofore been widely (or at all) considered for use in wired applications because the transmission channel is normally considered as a set of separate channels rather than as a multi-path shared common channel as is done in wireless applications). In addition, in the present embodiment, a further MRC type matrix is generated which enables beam forming to be used for the main and auxiliary signals. This requires identifying the cross-talk coupling coefficients, $H_{ab}$—where b relates to the transmitter elements of the first transceiver and a relates to the receiver elements of the second transmitter—(or $H_{ba}$—where a relates to the transmitter elements of the second transceiver and b to the receiver elements of the first transceiver) between transmitter elements (receiver elements) and receiver elements (transmitter elements) within the first and second transceivers and using these to modify components to be transmitted onto a line acting as an auxiliary line in dependence upon the cross-talk coupling from that auxiliary line to the main line.

Thus the components (one for each tone) from the QAM module 1621 are passed to a combined NSP and MRC precoding module 1630 which generates a main and an auxiliary component (more auxiliary components in embodiments containing more than two TMP's, in particular one for each usable channel to be used for carrying an auxiliary signal). These components are derived from the input complex number $x_1$ but modified to enable NSP type filtering to be used to reduce NEXT effects and to enable beam forming of the transmitted signals. This processing results in complex numbers $x_1'$ and $x_1''$ being generated (or more if more than two channels are being exploited for carrying auxiliary signals—e.g. if a phantom channel is additionally being used to carry an auxiliary signal).

These generated numbers are then passed to conventional Inverse Fast Fourier Transform (IFFT) modules 1641, 1642 and Analogue Front End (AFE) units 1651, 1652 in the normal manner to generate and transmit main and auxiliary signals respectively.

These signals propagate over the TMPs 31,32 (with the signals heavily cross-talking to one another) in such a way that the signals after cross-talking are received at the second receiver with a boosted SNR compared to if the auxiliary signal were not transmitted.

The propagated signals are received at AFE units 2651 and 2652 respectively and passed through Fast Fourier Transform (FFT) modules 2551 and 2552 in the normal manner to transform the received signals back into the frequency domain from the time domain. The resulting complex numbers (one for each tone—only one of which we are considering in FIG. 2), $y_1'$ and $y_1''$, are passed into a receive filtering module 2630 which processes the received signals to generate a single complex number (for each tone) which generates an approximation of the complex number $x_1'$ originally output by the QAM module 1621 (it is an approximation because of imperfections in the transmission system and noise added to the signal during its transmission and processing etc.). This approximation of $x_1'$, $\ddot{x}_1$, is then passed to an M-QAM demodulator unit 2621 which undoes the original mapping to recover (all being well supposing that the noise is not too great) the original data element $d_1$.

The generation of the matrices required to be used in the NSP and MRC precoder module and in the receive filtering module is performed using the techniques set out in the appendix.

Figure 3:
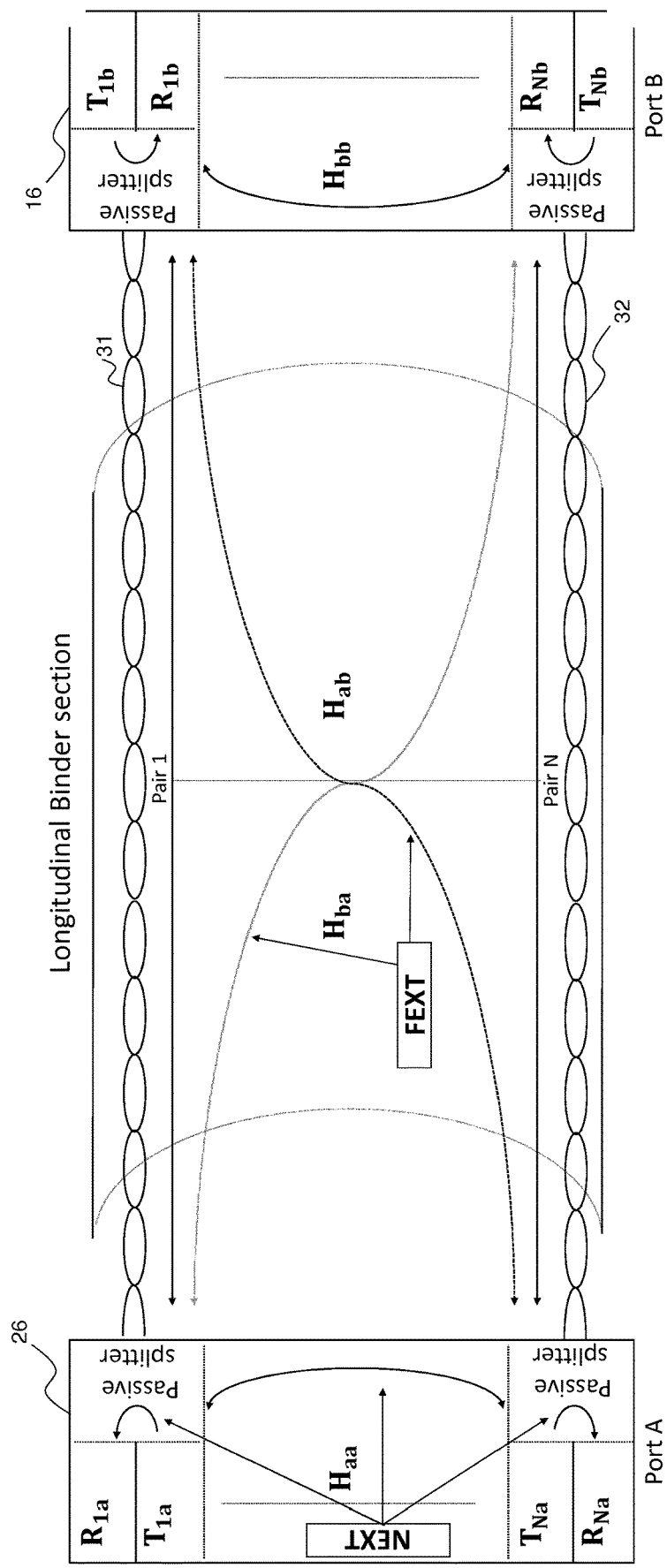
FIG. 3 is a diagram of a system comprising first and second transceivers according to embodiments of the present disclosure connected together by multiple pairs of twisted metallic wires.
Figure 4:
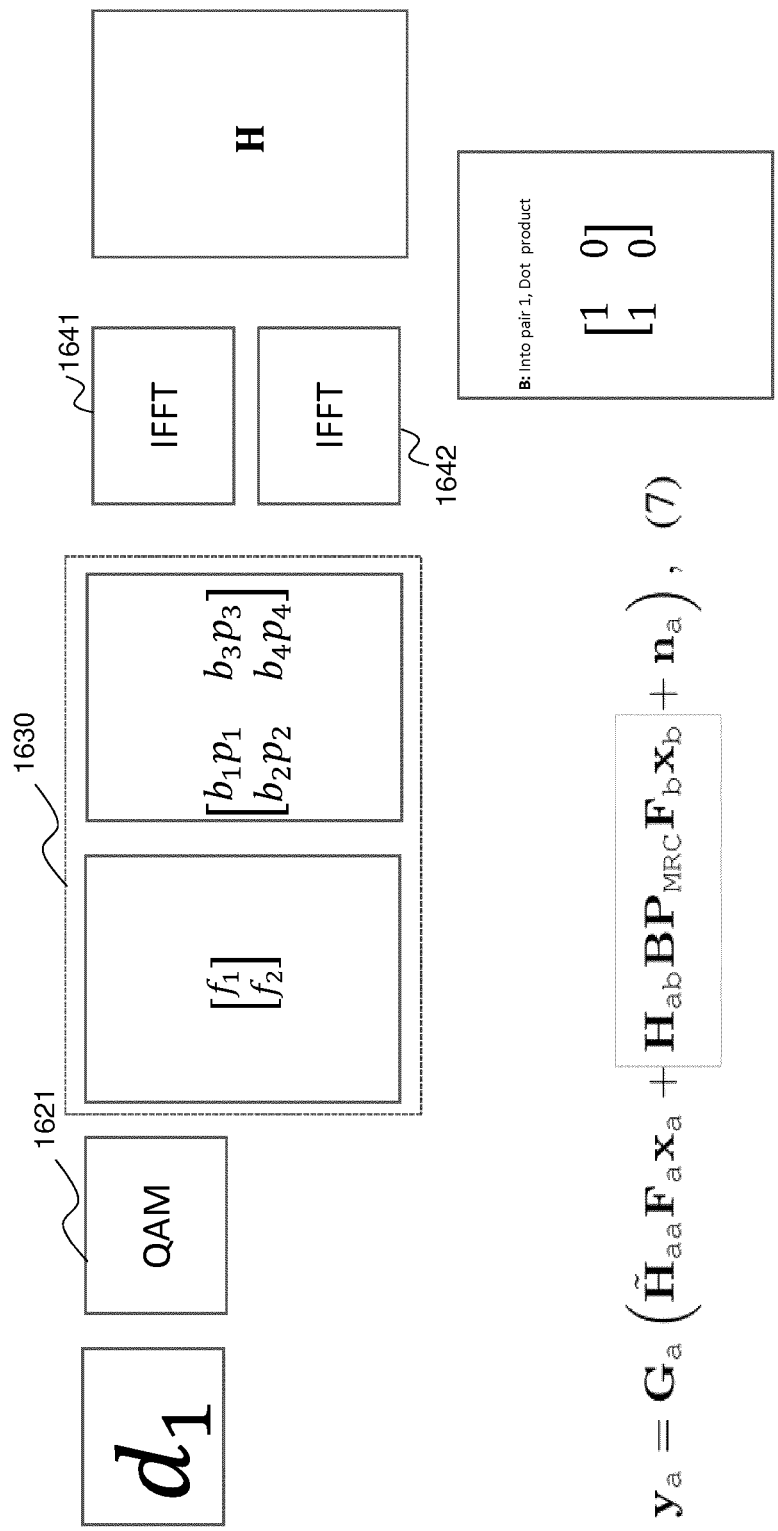
FIG. 4 is a block diagram illustrating the processing performed by the second transceiver in transmitting to the first transceiver.

FIG. 3 is a diagram of a transmission channel model appropriate for use in understanding the operation of embodiments of the present invention. As such it envisages a first and a second transceiver (Transceiver A and Transceiver B) having a port A and a port B respectively which are interconnected by a bundle of N twisted metallic pairs. The diagram illustrates that Near End cross(X)-Talk (NEXT) occurs when a signal transmitted by one of the transmitter elements T1$a$ to TN$a$ for transceiver A (and transmitter elements T1$b$ to TN$b$ for transmitter B) are received by one of receiver elements R1$a$ to RN$a$ for transceiver A (and receiver elements R1$b$ to RN$b$ for transceiver B) whilst Far End cross (X) Talk (FEXT) occurs for signals transmitted by any transmitter element Tia (for any i between 1 and N) and any receiver element Rjb where i≠j (and vice versa for transmissions from Transceiver B to Transceiver A). The figure also illustrates that the channel matrix Haa specifies NEXT cross couplings for Transceiver A, the channel matrix Hbb specifies NEXT cross couplings for Transceiver B, the channel matrix Hba specifies FEXT cross couplings from Transceiver A to Transceiver B and the channel matrix Hab specifies FEXT cross couplings from Transceiver B to Transceiver A. Passive splitters ensure that signals transmitted by transmitter elements are transmitted onto their respective connected pair and that signals carried on those pairs are also received by the respective receiver elements.

FIG. 2 illustrates the block processing required to be performed in embodiments of the invention. Underneath the block diagram is shown equation (7) from the appendix. In the case of a two channel system, this indicates that the signal received at the main and auxiliary channel receiver elements (say R1$a$ and R2$a$ where N equals 2) includes, as well as a noise component ($n_a$) and a NEXT component:

$$\tilde{H}_{aa}F_a x_a$$

a component resulting from processing performed at Transceiver B acting as a trans$H_{ab}BP_{MRC}F_b x_b$mitter:

$$H_{ab}(B \cdot P_{MRC})F_b x_b$$

As will be apparent to a person skilled in the art, this indicates that after conventional processing of a data stream d1 by a Quadrature Amplitude Modulator complex number $x_b$ is multiplied by NSP filter with diagonal components $f_1$ and $f_2$ (and zeros elsewhere) and then is multiplied by MRC type precoder matrix $$P = \begin{pmatrix} p_1 & p_3 \\ p_2 & p_4 \end{pmatrix}$$

which has firstly been "dot-producted" with the binary matrix B, before being processed conventionally by an Inverse Frequency Fourier Transform and then passed through the channel $H_{ab}$. The purpose of the Binary matrix B is to remove the effect of components of the MRC precoder matrix $P_{MRC}$ that relate to beam forming to any line other than the main active line. Generally speaking, the MRC precoder matrix is structured so that each column contains a value which maximizes the benefit of a signal transmitted onto a line associated with the row of the MRC precoder matrix to the receiver at the end of the line associated with the column of the matrix. Thus to "beam form" for the benefit of line 1 all values in the MRC precoder matrix outside of column 1 should be set to zero. In practice this can be done conveniently using a binary matrix having 1's in the column to which the beam forming is to be done and to set all other values to zero and then to perform a matrix dot product between the binary matrix and the precoder matrix (as a prior step to any other matrix multiplication). Other techniques for achieving the same aim will of course be apparent to persons skilled in the art.

The manner in which this can be implemented will be apparent to the person skilled in the art based on the above disclosure and the further details provided in the appendix.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived there from. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of transmitting, using a discrete multi-tone technique, data between a first transceiver and a second transceiver over a plurality of metallic pairs, connected between the first transceiver and the second transceiver, providing a plurality of transmission channels, the method comprising:
    receiving at the first transceiver a data stream for transmission to the second receiver;
    generating from the data stream a main transmission signal for transmission over one of the plurality of transmission channels operating as a main transmission channel;
    generating from the data stream an auxiliary transmission signal for transmission over another one of the plurality of transmission channels operating as an auxiliary transmission channel;
    receiving at the second transceiver from the main transmission channel a main received signal and receiving at the second transceiver from the auxiliary transmission channel an auxiliary received signal; and
    processing the main received signal and the auxiliary received signal in order to recover the data stream received at the first transceiver;
    wherein the auxiliary transmission signal is generated in dependence upon a measurement of a cross-talk coupling from a point of transmission from the first transceiver onto the auxiliary transmission channel to a point of reception at the second transceiver from the main transmission channel, and wherein the processing of the main received signal and the auxiliary received signal is done in dependence upon measurements of a cross-talk coupling from a point of transmission from the first transceiver onto the main transmission channel to a point of reception at the first transceiver from the auxiliary transmission channel or vice versa, and of a cross-talk coupling from a point of transmission from the second transceiver onto the main transmission channel to a point of reception at the second transceiver from the auxiliary transmission channel.

2. The method as claimed in claim 1, wherein generating the auxiliary transmission signal includes processing the auxiliary transmission signal prior to transmission from the first transceiver.

3. The method as claimed in claim 2, wherein the processing the auxiliary transmission signal prior to transmission from the first transceiver involves multiplying the auxiliary transmission signal by a digital spatial filter.

4. The method as claimed in claim 1, the method further comprising:
    applying a pre-coding to the main transmission signal transmitted by the second transceiver and applying processing to at least one of the main transmission signal or the auxiliary transmission signal received by the second transceiver, the processing being related to the pre-coding such that any component of the main received signal or the auxiliary received signal that is an echo of a signal transmitted onto the main transmission channel by the second transceiver is reduced in size to zero.

5. The method as claimed in claim 4, wherein the pre-coding applied to the main transmission signal transmitted by the second transceiver and the processing applied to the main received signal or the main auxiliary received signal are dependent on measurements of cross-talk coupling from the point of transmission of the second transceiver onto the main transmission channel to the point of reception at the second transceiver from the auxiliary transmission channel.

6. A method of transmitting, using a discrete multi-tone technique, data between a first transceiver and a second transceiver over a plurality of metallic pairs, connected between the first transceiver and the second transceiver, providing a plurality of transmission channels, the method comprising:
    receiving at the first transceiver a data stream for transmission to the second receiver;
    generating from the data stream a transmission signal for transmission over one of the plurality of transmission channels operating as a main transmission channel;
    receiving at the second transceiver from the transmission channel a main received signal and receiving at the second transceiver from a phantom channel, also connecting the first transceiver and the second transceiver, an auxiliary received signal; and
    processing the main received signal and the auxiliary received signal in order to recover the data stream received at the first transceiver;
    wherein the processing of the main received signal and the auxiliary received signal is done in dependence upon measurements of a cross-talk coupling from a point of transmission from the first transceiver onto the main transmission channel to a point of reception at the first transceiver from the phantom channel or vice versa, and of a cross-talk coupling from a point of transmission from the second transceiver onto the main transmission channel to a point of reception at the second transceiver from the phantom channel.

7. An apparatus for transmitting, using a discrete multi-tone technique, data between a first transceiver and a second transceiver over a plurality of metallic pairs, connected between the first transceiver and the second transceiver, providing a plurality of transmission channels, the apparatus comprising:
    the first transceiver which is operable to receive a data stream for transmission to the second transceiver, to generate from the data stream a main transmission signal and to transmit the main transmission signal over one of the plurality of transmission channels operating as a main transmission channel and further being operable to generate, from the data stream, an auxiliary transmission signal and to transmit the auxiliary transmission signal over another one of the plurality of transmission channels operating as an auxiliary transmission channel; and
    the second transceiver which is operable to receive, from the main transmission channel, a main received signal and, from the auxiliary transmission channel, an auxiliary received signal; wherein the second transceiver is operable to process the main received signal and the auxiliary received signal in order to recover the data stream received at the first transceiver; and
    wherein the first transceiver is operable to generate the auxiliary transmission signal in dependence upon a measurement of a cross-talk coupling from a point of transmission from the first transceiver onto the auxiliary transmission channel to a point of reception at the second transceiver from the main transmission channel, and wherein the second transceiver is operable to process the main received signal and the auxiliary received signal in dependence upon measurements of a cross-talk coupling from a point of transmission from the first transceiver onto the main transmission channel to a point of reception at the first transceiver from the auxiliary transmission channel or vice versa, and of a cross-talk coupling from a point of transmission from the second transceiver onto the main transmission channel to a point of reception at the second transceiver from the auxiliary transmission channel in order to recover the transmitted data.

8. The apparatus as claimed in claim 7, wherein the first transceiver is operable to process the auxiliary transmission signal prior to transmission, the processing including maximum ratio combining.

9. The apparatus as claimed in claim 7, wherein the first transceiver is operable to multiply the auxiliary transmission signal by a digital spatial filter.

10. The apparatus as claimed in claim 7, wherein the second transceiver is operable to apply a pre-coding to the main transmission signal transmitted by the second transceiver and is further operable to apply processing to at least one of the main received signal or the auxiliary received signal, the processing being related to the pre-coding such that any component of the main received signal or the main and/or auxiliary received signal that is an echo of a signal transmitted onto the main transmission channel by the second transceiver is reduced in size to zero.

11. The apparatus as claimed in claim 10, wherein the pre-coding that the second transceiver is operable to apply to the main transmission signal and the processing that the second transceiver is operable to apply to the main received signal or the auxiliary received signal are dependent on measurements of cross-talk coupling from the point of transmission of the second transceiver onto the main transmission channel to the point of reception at the second transceiver from the auxiliary transmission channel.

12. An apparatus for transmitting, using a discrete multitone technique, data between a first transceiver and a second transceiver over a plurality of metallic pairs, connected between the first transceiver and the second transceiver, providing a plurality of transmission channels, the apparatus comprising:

the first transceiver which is operable to receive a data stream for transmission to the second transceiver, to generate from the data stream a main transmission signal and to transmit the main transmission signal over one of the plurality of transmission channels operating as a main transmission channel; and the second transceiver which is operable to receive, from the main transmission channel, a main received signal and, from a phantom channel extending between the first transceiver and the second transceiver, an auxiliary received signal and to process the main received signal and the auxiliary received signal in order to recover the data stream received at the first transceiver;

wherein the second transceiver is operable to process the main received signal and the auxiliary received signal in dependence upon measurements of a cross-talk coupling from a point of transmission from the first transceiver onto the main transmission channel to a point of reception at the first transceiver from the phantom channel or vice versa, and in dependence upon measurements of a cross-talk coupling from a point of transmission from the second transceiver onto the main transmission channel to a point of reception at the second transceiver from the phantom channel in order to recover the transmitted data.

\* \* \* \* \*